(12) United States Patent
Tu

(10) Patent No.: US 10,097,238 B2
(45) Date of Patent: Oct. 9, 2018

(54) LINE SYNCHRONIZATION METHOD IN OSD SYSTEM, SYSTEM, AND VECTORING CONTROL ENTITY

(71) Applicant: Huawei Technologies Co., Ltd., Shenzhen (CN)

(72) Inventor: Jianping Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 15/250,144

(22) Filed: Aug. 29, 2016

(65) Prior Publication Data

US 2016/0365896 A1 Dec. 15, 2016

Related U.S. Application Data

(63) Continuation of application No. PCT/CN2014/074456, filed on Mar. 31, 2014.

(30) Foreign Application Priority Data

Feb. 27, 2014 (WO) ................ PCT/CN2014/072633

(51) Int. Cl.
*H04B 3/32* (2006.01)
*H04B 3/487* (2015.01)
(Continued)

(52) U.S. Cl.
CPC ............... *H04B 3/487* (2015.01); *H04B 3/32* (2013.01); *H04L 1/00* (2013.01); *H04L 2012/6478* (2013.01)

(58) Field of Classification Search
None
See application file for complete search history.

(56) References Cited

U.S. PATENT DOCUMENTS

| 9,667,313 B2 * | 5/2017 | Colonques ............... H04B 3/32 |
| 2003/0086362 A1 | 5/2003 | Hasegawa et al. |

(Continued)

FOREIGN PATENT DOCUMENTS

| CN | 102396160 A | 3/2012 |
| CN | 103178897 A | 6/2013 |
| CN | 103503398 A | 1/2014 |

OTHER PUBLICATIONS

"Series G: Transmission Systems and Media, Digital Systems and Networks, Digital sections and digital line system—Metallic access networks, Self-FEXT cancellation (vectoring) for use with VDSL2 transceivers, Amendment 4," ITU-T, G.993.5, Amendment 4, Aug. 2013, 18 pages.

(Continued)

*Primary Examiner* — Duc T Duong
(74) *Attorney, Agent, or Firm* — Conley Rose, P.C.

(57) ABSTRACT

A line synchronization method in an overlapped spectrum duplex OSD system having K pairs of communications lines. Each pair of communications lines includes an uplink and a downlink. The method includes synchronizing downstream synchronization symbols of downlinks in all of the pairs of communications lines, and separately synchronizing an upstream synchronization symbol of an uplink of each pair of communications lines with a downstream synchronization symbol of a downlink of each pair of communications lines. The method may be applied to crosstalk channel estimation to distinguish NEXT and FEXT crosstalk channels when upstream and downstream spectrums are overlapped.

18 Claims, 5 Drawing Sheets

(51) Int. Cl.
*H04L 1/00* (2006.01)
*H04L 12/64* (2006.01)

(56) References Cited

U.S. PATENT DOCUMENTS

| | | |
|---|---|---|
| 2009/0175156 A1 | 7/2009 | Xu |
| 2009/0296865 A1 | 12/2009 | Ashikhmin et al. |
| 2011/0007788 A1* | 1/2011 | Cendrillon ............... H04B 3/32 375/222 |
| 2013/0208579 A1* | 8/2013 | Strobel .................... H04B 3/32 370/201 |
| 2014/0050227 A1* | 2/2014 | Goodson ............... H04L 5/0058 370/442 |
| 2014/0140187 A1* | 5/2014 | Wang ....................... H04B 3/32 370/201 |
| 2014/0241384 A1* | 8/2014 | Du ....................... H04L 27/2613 370/515 |
| 2014/0307749 A1* | 10/2014 | Liang .................. H04L 27/2601 370/509 |
| 2015/0215059 A1* | 7/2015 | Kerpez ................ H04M 11/062 379/406.01 |
| 2016/0105216 A1* | 4/2016 | Wang ....................... H04B 3/32 379/406.01 |
| 2016/0119025 A1* | 4/2016 | Strobel ................ H04M 11/062 370/201 |

OTHER PUBLICATIONS

Foreign Communication From a Counterpart Application, European Application No. 14883622.4, Extended European Search Report dated Dec. 22, 2016, 8 pages.

Foreign Communication From a Counterpart Application, PCT Application No. PCT/CN2014/072633, English Translation of International Search Report dated Dec. 2, 2014, 2 pages.

Foreign Communication From a Counterpart Application, PCT Application No. PCT/CN2014/072633, English Translation of Written Opinion dated Dec. 2, 2014, 7 pages.

Foreign Communication From a Counterpart Application, PCT Application No. PCT/CN2014/074456, English Translation of International Search Report dated Dec. 8, 2014, 2 pages.

Foreign Communication From a Counterpart Application, PCT Application No. PCT/CN2014/074456, English Translation of Written Opinion dated Dec. 12, 2014, 7 pages.

* cited by examiner $$\begin{array}{rrrr} 1 & 1 & 1 & 1 \\ 1 & -1 & 1 & -1 \\ 1 & 1 & -1 & -1 \\ 1 & -1 & -1 & 1 \end{array}$$
FIG. 8
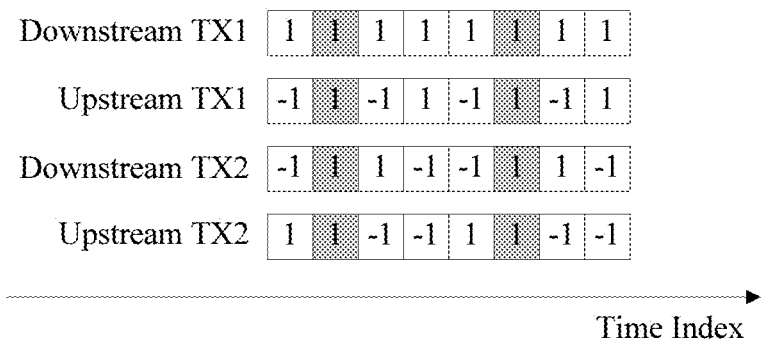
FIG. 9
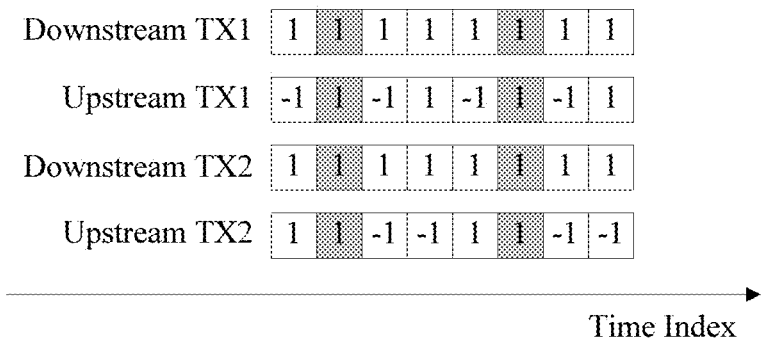
FIG. 10

LINE SYNCHRONIZATION METHOD IN OSD SYSTEM, SYSTEM, AND VECTORING CONTROL ENTITY

CROSS-REFERENCE TO RELATED APPLICATIONS

This application is a continuation of International Application No. PCT/CN2014/074456, filed on Mar. 31, 2014, which claims priority to International Application No. PCT/CN2014/072633, filed on Feb. 27, 2014, both of which are hereby incorporated by reference in their entireties.

TECHNICAL FIELD

The present invention relates to the communications field, and in particular, to a line synchronization method in an overlapped spectrum duplex (OSD) system, a system, and a vectoring control entity.

BACKGROUND

A digital subscriber line (xDSL) is a high-speed data transmission technology for transmission on an unshielded twisted pair (UTP) cable. Except a digital subscriber line for baseband transmission, an xDSL for passband transmission enables the xDSL and a traditional telephone service to coexist on a same pair of twisted pair cables by using a frequency division multiplexing technology. The xDSL occupies a high frequency band, the traditional telephone service occupies a baseband below 4 kilohertz (KHz), and a traditional telephone service signal is separated from an xDSL signal by using a splitter. The xDSL for the passband transmission is modulated by using discrete multitone. A system for providing multiple xDSL access is referred to as a DSL access multiplexer (DSLAM). As shown in FIG. 1 and FIG. 2 multiple channels of signals that access the DSLAM on lines between central office (CO) end devices and customer premises equipment (CPE) interfere with each other due to the principle of electromagnetic induction, which is referred to as crosstalk.

Energy of both near-end crosstalk (NEXT) and far-end crosstalk (FEXT) is enhanced as a frequency band increases. Because DSL spectrum resources are limited, and a longer line indicates larger attenuation, a resource of a higher spectrum cannot improve performance. In an OSD system, because NEXT crosstalk is generated when upstream and downstream spectrums are overlapped, an xDSL line or service is affected by the NEXT crosstalk more severely when a wider frequency band is used.

Although a vectoring technology in existing G993.5 standards cancels FEXT crosstalk, an NEXT crosstalk problem in an OSD system cannot be resolved. Consequently, performance of the OSD system sharply degrades. To reduce impact from the NEXT crosstalk, NEXT and FEXT joint cancellation needs to be used to cancel the NEXT and FEXT crosstalk, or a DSM level 2 (L2) dynamic spectrum management technology is used to restrain the NEXT crosstalk. A prerequisite for using these technologies is to estimate an NEXT crosstalk channel.

In the prior art, a crosstalk channel estimation method includes sending a downstream probing signal and receiving an NEXT crosstalk signal in an upstream direction within an upstream silent period so that the NEXT crosstalk channel is obtained through measurement. Similar operations are performed in a downstream direction. A disadvantage of the crosstalk channel estimation method is that when a signal is also sent in an uplink direction, an uplink received signal includes both the FEXT crosstalk and the NEXT crosstalk that cannot be separated. Therefore, there is a relatively large error in measuring a crosstalk channel.

SUMMARY

An objective of embodiments of the present invention is to provide a crosstalk channel estimation method so as to distinguish NEXT and FEXT crosstalk channels when upstream and downstream spectrums are overlapped.

To achieve the foregoing objective, according to a first aspect, an embodiment of the present invention provides a line synchronization method applied to an overlapped spectrum duplex OSD system having K pairs of communications lines, wherein each pair of communications lines includes an uplink and a downlink. The method includes synchronizing downstream synchronization symbols of downlinks in all of the pairs of communications lines and separately synchronizing an upstream synchronization symbol of an uplink of each pair of communications lines with a downstream synchronization symbol of a downlink of each pair of communications lines.

Based on the first aspect, in a first possible implementation manner, the synchronizing downstream synchronization symbols of downlinks in all of the communications lines includes configuring all central office sending units in a vectoring group so that downstream synchronization symbols sent by all of the central office sending units are at a same location, where the vectoring group includes the multiple central office sending units and multiple far-end sending units, wherein each of the central office sending units controls one of the downlinks in the OSD system, and wherein each of the far-end sending units controls one of the uplinks in the OSD system.

Based on the first possible implementation manner of the first aspect, in a second possible implementation manner, the separately synchronizing an upstream synchronization symbol of an uplink of each pair of communications lines with a downstream synchronization symbol of a downlink of each pair of communications lines includes configuring all of the far-end sending units that are in the vectoring group so that upstream synchronization symbols sent by all of the far-end sending units and the downstream synchronization symbols sent by all of the central office sending units are at a same location.

Based on the second possible implementation manner of the first aspect, in a third possible implementation manner, the configuring all of the far-end sending units in the vectoring group so that upstream synchronization symbols sent by all of the far-end sending units and the downstream synchronization symbols sent by all of the central office sending units are at a same location includes controlling each central office sending unit to send a synchronization request to a corresponding far-end sending unit, where the synchronization request includes a downstream synchronization symbol count, so that after receiving the synchronization request the far-end sending unit enables an upstream synchronization symbol and a downstream synchronization symbol to be at a same location according to the downstream synchronization symbol count.

Based on the first aspect, in a fourth possible implementation manner, the OSD system includes a vectoring group including central office sending units and far-end sending units, wherein each of the central office sending units controls one of the downlinks, and wherein each of the far-end sending units controls one of the uplinks, and the method further includes configuring all of the central office sending units or the far-end sending units in the vectoring group when there is a non-vectoring group so that synchronization symbols sent by all of the central office sending units or the far-end sending units in the vectoring group are at a same location, and configuring all central office sending units or far-end sending units in the non-vectoring group so that locations of synchronization symbols sent by the central office sending units or the far-end sending units in the non-vectoring group and locations of the synchronization symbols sent by the central office sending units or far-end sending units in the vectoring group are staggered.

Based on the first aspect, in a fifth possible implementation manner, after the separately synchronizing an upstream synchronization symbol of an uplink of each pair of communications lines with a downstream synchronization symbol of a downlink of each pair of communications lines, the method further includes allocating pilot sequences to the K pairs of communications lines, where pilot sequences allocated to each pair of communications lines are unrelated to pilot sequences allocated to the other K−1 pairs of communications lines, and an upstream pilot sequence allocated to the uplink in each pair of communications lines is unrelated to a downstream pilot sequence allocated to the downlink in each pair of communications lines; controlling a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines; acquiring a downstream feedback error and an upstream feedback error of the downstream pilot sequence in each pair of communications lines; and estimating a crosstalk channel for the OSD system according to the upstream feedback error and the downstream feedback error.

Based on the fifth possible implementation manner of the first aspect, in a sixth possible implementation manner, the upstream synchronization symbols and the downstream synchronization symbols are synchronization symbols, and wherein the separately synchronizing an upstream synchronization symbol of an uplink of each pair of communications lines with a downstream synchronization symbol of a downlink of each pair of communications lines includes instructing a customer premises equipment side to align the upstream synchronization symbol of the uplink with the downstream synchronization symbol of the downlink in each pair of communications lines.

Based on the fifth possible implementation manner of the first aspect, in a seventh possible implementation manner, the upstream synchronization symbols and the downstream synchronization symbols are synchronization symbols, and wherein the separately synchronizing an upstream synchronization symbol of an uplink of each pair of communications lines with a downstream synchronization symbol of a downlink of each pair of communications lines includes instructing customer premises equipment to align the upstream synchronization symbols of the uplinks in all of the communications lines; and sending a symbol quantity offset between the upstream synchronization symbols and the downstream synchronization symbols in all of the communications lines to the customer premises equipment, so that the customer premises equipment makes an adjustment according to the symbol quantity offset, to synchronize the upstream synchronization symbols in all of the communications lines with the downstream synchronization symbols in all of the communications lines.

Based on the fifth possible implementation manner of the first aspect, in an eighth possible implementation manner, wherein before the allocating pilot sequences to the K pairs of communications lines, the method further includes generating 2K orthogonal pilot sequences, allocating K of the 2K pilot sequences to K downlinks, allocating the remaining K pilot sequences to K uplinks, and sending, to customer premises equipment by using a special operation channel, the K pilot sequences allocated to the K uplinks and locations of synchronization symbols for synchronously sending the pilot sequences.

Based on the fifth possible implementation manner of the first aspect, in a ninth possible implementation manner, the upstream synchronization symbols and the downstream synchronization symbols are data symbols, and wherein the separately synchronizing an upstream synchronization symbol of an uplink of each pair of communications lines with a downstream synchronization symbol of a downlink of each pair of communications lines includes aligning the data symbols with synchronization symbols of a vectoring line.

Based on the fifth possible implementation manner of the first aspect, in a tenth possible implementation manner, the downstream feedback error and the upstream feedback error of the downstream pilot sequence in each pair of communications lines are acquired, where the downstream feedback error is an error fed back by a user end in an embedded operation channel, and wherein the upstream feedback error is obtained according to a received probing signal sent by a user side.

Based on the fifth possible implementation manner of the first aspect, in an eleventh possible implementation manner, the controlling a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines further includes configuring all central office sending units that are in a vectoring group so that all of the central office sending units modulate, on downstream synchronization symbols having an index, downstream pilot sequences having the same index, and configuring all far-end sending units that are in the vectoring group so that all of the far-end sending units modulate, on upstream synchronization symbols having an index, upstream pilot sequences having the same index.

Based on the eleventh possible implementation manner of the first aspect, in a twelfth possible implementation manner, the configuring all central office sending units in a vectoring group so that all of the central office sending units modulate, on downstream synchronization symbols having an index, downstream pilot sequences having the same index includes controlling a central office sending unit to notify a far-end sending unit of a downstream index value of a currently sent pilot sequence and an allocated upstream pilot sequence so that an index value of the upstream pilot sequence modulated on an upstream synchronization symbol is the same as an index value of a downstream pilot sequence modulated on a downstream synchronization symbol.

According to a second aspect, an embodiment of the present invention provides a vectoring control entity applied to an OSD system including K pairs of communications lines, wherein each pair of communications lines includes an uplink and a downlink. The vectoring control entity includes a memory and a processor operably coupled to the memory. The processor is configured to synchronize downstream synchronization symbols of downlinks in all of the communications lines and separately synchronize an upstream synchronization symbol of an uplink of each pair of communications lines with a downstream synchronization symbol of a downlink of each pair of communications lines.

Based on the second aspect, in a first possible implementation manner, the first synchronization unit is configured to configure all central office sending units that are in a vectoring group, so that downstream synchronization symbols sent by all of the central office sending units are at a same location, where the vectoring group includes the multiple central office sending units and multiple far-end sending units, wherein each of the central office sending units controls one of the downlinks in the OSD system, and wherein each of the far-end sending units controls one of the uplinks in the OSD system.

Based on the first possible implementation manner of the second aspect, in a second possible implementation manner, the second synchronization unit is configured to configure all of the far-end sending units in the vectoring group, so that upstream synchronization symbols sent by all of the far-end sending units and the downstream synchronization symbols sent by all of the central office sending units are at a same location.

Based on the second possible implementation manner of the second aspect, in a third possible implementation manner, the second synchronization unit is configured to control each central office sending unit to send a synchronization request to a corresponding far-end sending unit, where the synchronization request includes a downstream synchronization symbol count, so that after receiving the synchronization request, the far-end sending unit enables an upstream synchronization symbol and a downstream synchronization symbol to be at a same location according to the downstream synchronization symbol count.

Based on the second aspect, in a fourth possible implementation manner, the OSD system includes a vectoring group, wherein the vectoring group includes central office sending units and far-end sending units, wherein each of the central office sending units controls one of the downlinks, and each of the far-end sending units controls one of the uplinks, and wherein the processor is further configured to configure all of the central office sending units or the far-end sending units in the vectoring group when there is a non-vectoring group in the OSD system so that synchronization symbols sent by all of the central office sending units or the far-end sending units in the vectoring group are at a same location, and configure all central office sending units or far-end sending units in the non-vectoring group, so that locations of synchronization symbols sent by the central office sending units or the far-end sending units in the non-vectoring group and locations of the synchronization symbols sent by the central office sending units or far-end sending units in the vectoring group are staggered.

Based on the second aspect, in a fifth possible implementation manner, the processor is further configured to allocate pilot sequences to the K pairs of communications lines, where pilot sequences allocated to each pair of communications lines are unrelated to pilot sequences allocated to the other K−1 pairs of communications lines, and an upstream pilot sequence allocated to the uplink in each pair of communications lines is unrelated to a downstream pilot sequence allocated to the downlink in each pair of communications lines, control a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines, acquire a downstream feedback error and an upstream feedback error of the downstream pilot sequence in each pair of communications lines, and estimate a crosstalk channel for the OSD system according to the upstream feedback error and the downstream feedback error.

Based on the fifth possible implementation manner of the second aspect, in a sixth possible implementation manner, the processor is further configured to instruct a customer premises equipment side to align the upstream synchronization symbol of the uplink with the downstream synchronization symbol of the downlink in each pair of communications lines.

Based on the fifth possible implementation manner of the second aspect, in a seventh possible implementation manner, the processor is further configured to instruct customer premises equipment to align the upstream synchronization symbols of the uplinks in all of the communications lines; and send a symbol quantity offset between the upstream synchronization symbols and the downstream synchronization symbols in all of the communications lines to the customer premises equipment, so that the customer premises equipment makes an adjustment according to the symbol quantity offset, to synchronize the upstream synchronization symbols in all of the communications lines with the downstream synchronization symbols in all of the communications lines.

Based on the fifth possible implementation manner of the second aspect, in an eighth possible implementation manner, the pilot sequence allocation unit is configured to generate 2K orthogonal pilot sequences, allocate K of the 2K pilot sequences to K downlinks, allocate the remaining K pilot sequences to K uplinks, and send, to customer premises equipment by using a special operation channel, the K pilot sequences allocated to the K uplinks and locations of synchronization symbols for synchronously sending the pilot sequences.

Based on the fifth possible implementation manner of the second aspect, in a ninth possible implementation manner, the upstream synchronization symbols and the downstream synchronization symbols are data symbols, and the synchronization units are configured to align the data symbols with synchronization symbols of a vectoring line.

Based on the fifth possible implementation manner of the second aspect, in a tenth possible implementation manner, the processor is further configured to acquire the downstream feedback error from errors that are fed back by a user end in an embedded operation channel, and obtain the upstream feedback error according to a received probing signal sent by a user side.

Based on the fifth possible implementation manner of the second aspect, in an eleventh possible implementation manner, the processor is further configured to configure all central office sending units that are in a vectoring group so that all of the central office sending units modulate, on downstream synchronization symbols having an index, downstream pilot sequences having the same index, and configure all far-end sending units that are in the vectoring group, so that all of the far-end sending units modulate, on upstream synchronization symbols having an index, upstream pilot sequences having the same index.

Based on the fifth possible implementation manner of the second aspect, in a twelfth possible implementation manner, the processor is further configured to control a central office sending unit to notify a far-end sending unit of a downstream index value of a currently sent pilot sequence and an allocated upstream pilot sequence so that an index value of the upstream pilot sequence modulated on an upstream synchronization symbol is the same as an index value of a downstream pilot sequence modulated on a downstream synchronization symbol.

According to a third aspect, an embodiment of the present invention provides an OSD system including a central office device, customer premises equipment, and any vectoring control entity according to the second aspect. The vectoring control entity and the central office device are connected, and the central office device is connected to the customer premises equipment by using the K pairs of communications lines.

According to the line synchronization method in the embodiments of the present invention, upstream symbols and downstream symbols of uplinks and downlinks in all communications lines in an OSD system are synchronized, a downstream transmitter may be controlled to send unrelated pilot sequences by using a downstream symbol and an upstream symbol of each pair of communications line, and pilot sequences sent between each pair of communications lines are also unrelated to others, feedback errors of an uplink and a downlink are acquired, and a crosstalk channel is estimated for the OSD system according to the feedback errors. According to the embodiments of the present invention, NEXT and FEXT crosstalk channels can be distinguished when upstream and downstream spectrums are overlapped.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 8 is a schematic diagram of a pilot sequence allocation matrix generated in an embodiment of the present invention.

FIG. 9 is a schematic diagram of allocation of pilot sequences in an embodiment of the present invention.

FIG. 10 is a schematic diagram of allocation of pilot sequences in another embodiment of the present invention.

DESCRIPTION OF EMBODIMENTS

Figure 1:
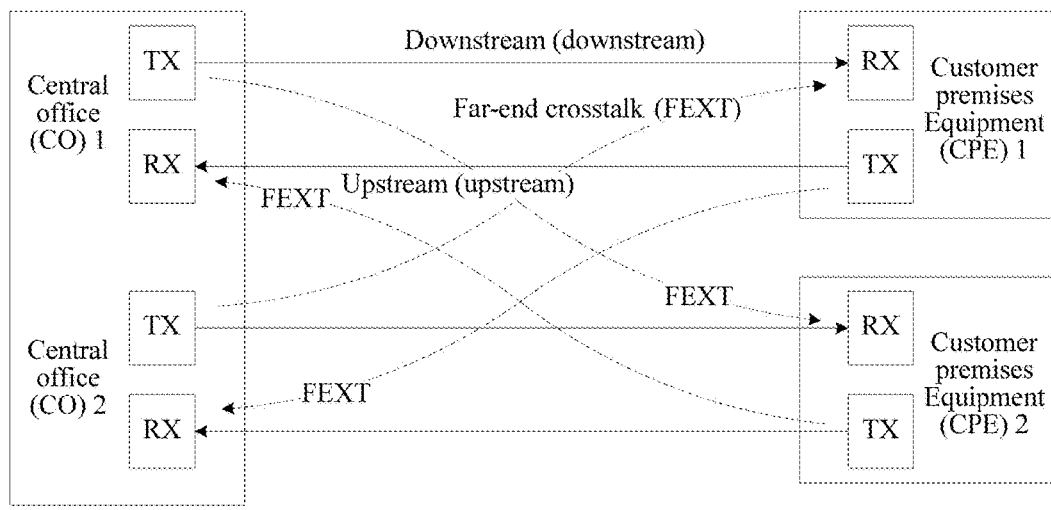
FIG. 1 is a schematic diagram of far-end crosstalk of an xDSL system.
Figure 2:
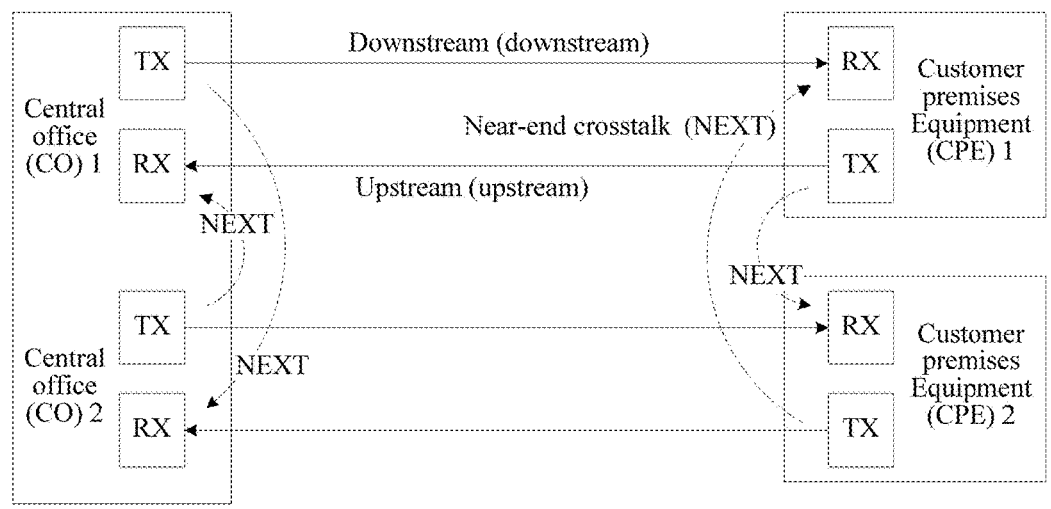
FIG. 2 is a schematic diagram of near-end crosstalk of an xDSL system.
Figure 3:
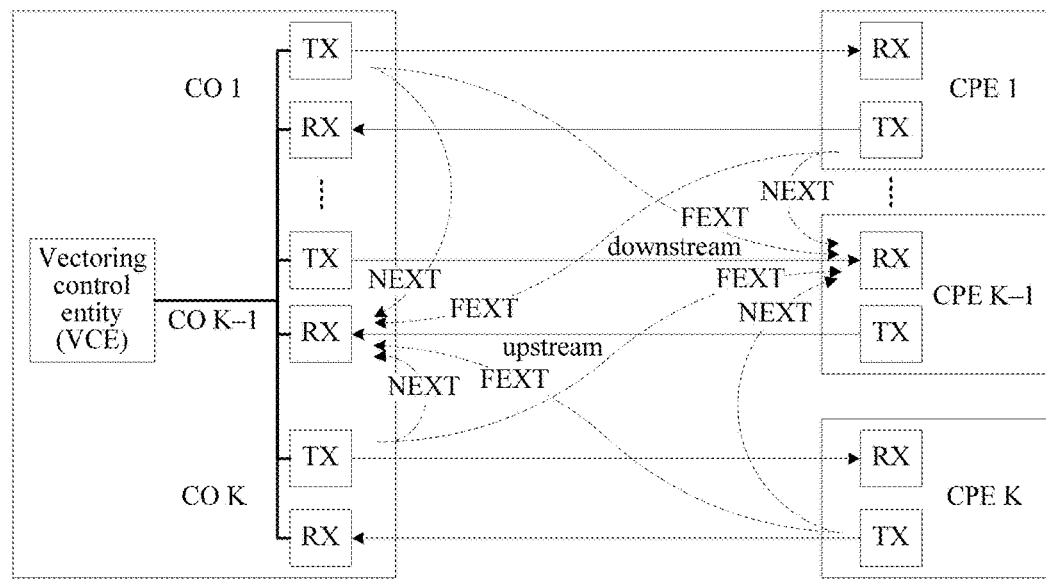
FIG. 3 is a system architectural diagram of an OSD system according to an embodiment of the present invention.

FIG. 3 is an architectural diagram of an application system according to an embodiment of the present invention. An OSD system has K pairs of communications lines. Each pair of communications lines includes an uplink and a downlink. A $(K-1)^{th}$ pair of communications lines is used as an example. The $(K-1)^{th}$ pair of communications lines suffers, in an upstream direction, upstream FEXT crosstalk and upstream NEXT crosstalk from the other K−1 pairs of communications lines, and the $(K-1)^{th}$ pair of communications lines suffers, in a downstream direction, downstream FEXT crosstalk and downstream NEXT crosstalk from the other K−1 pairs of communications lines. A vectoring control entity (VCE) controls all of the communications lines, collects related information from the communications lines, and estimates NEXT and FEXT crosstalk channels according to the information. Generally, the VCE is on a central office side.

The OSD system includes a vectoring group. The vectoring group includes central office sending units and far-end sending units. Each of the central office sending units controls one of the downlinks, and each of the far-end sending units controls one of the uplinks.

Figure 4:
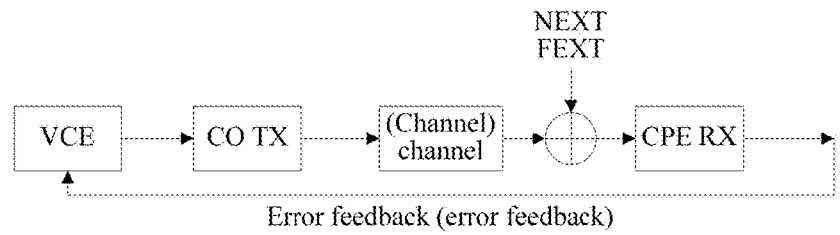
FIG. 4 is a schematic diagram of estimation of downstream near-end crosstalk.

As shown in FIG. 4, in a downstream direction, the VCE controls a transmitter of a central office device (CO TX) to send a probing signal, where the probing signal goes through a downstream channel and is mixed together with downstream NEXT and FEXT crosstalk. After a receiver of customer premises equipment (CPE RX) receives the signal that is interfered with, the customer premises equipment determines an error for the received signal and feeds back the determined error to a central office estimation unit by using an upstream channel to estimate downstream NEXT crosstalk.

Figure 5:
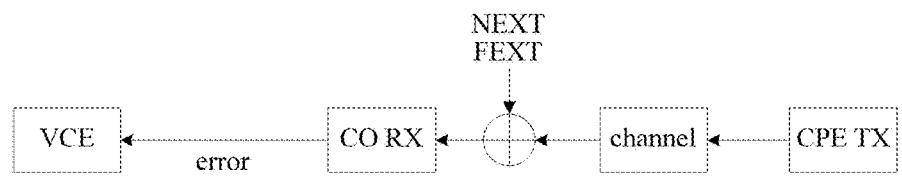
FIG. 5 is a schematic diagram of estimation of upstream near-end crosstalk.

As shown in FIG. 5, in an upstream direction, a transmitter of the CPE TX sends a probing signal, where the probing signal goes through an upstream channel and is mixed together with upstream NEXT and FEXT crosstalk. After a receiver of the CO RX receives the signal that is interfered with, the central office device determines an error for the received signal and directly transmits the determined error to the estimation unit to estimate upstream NEXT crosstalk.

Disclosed herein is a method to simultaneously send probing signals by using upstream and downstream synchronization symbols of multiple pairs of communications lines, where the probing signals carry unrelated pilot sequences, and to acquire feedback errors on the probing signals to estimate an NEXT crosstalk channel.

Figure 6:
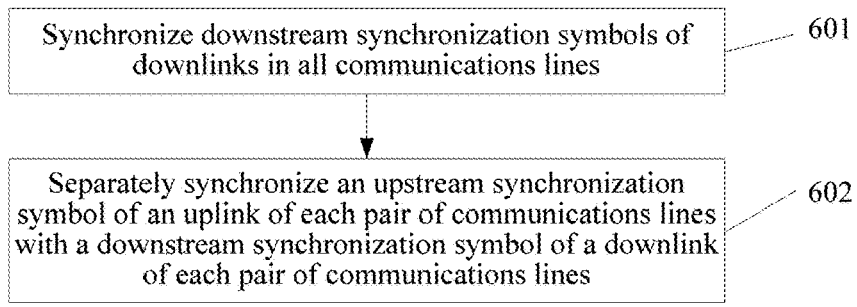
FIG. 6 is a flowchart of a line synchronization method according to an embodiment of the present invention.

As shown in FIG. 6, an embodiment of the present invention first provides a line synchronization method in an OSD system, where the method is applied to an overlapped spectrum duplex OSD system. The OSD system includes K pairs of communications lines and each pair of communications lines includes an uplink and a downlink. The method includes the following steps.

601: Synchronize downstream synchronization symbols of downlinks in all of the communications lines.

602: Separately synchronize an upstream synchronization symbol of an uplink of each pair of communications lines with a downstream synchronization symbol of a downlink of each pair of communications lines.

In an implementation manner, step 601 may be implemented in the following manner. All central office sending units in a vectoring group are configured by using a vectoring control entity so that downstream synchronization symbols sent by all of the central office sending units are at a same location. The vectoring group includes the multiple central office sending units and multiple far-end sending units. Each of the central office sending units controls one of the downlinks in the OSD system, and each of the far-end sending units controls one of the uplinks in the OSD system.

Similarly, step 602 may be implemented in the following manner. All far-end sending units in the vectoring group are configured by using the vectoring control entity so that upstream synchronization symbols sent by all of the far-end sending units and the downstream synchronization symbols sent by all of the central office sending units are at a same location.

The configuring, by the vectoring control entity, all of the far-end sending units that are in the vectoring group so that upstream synchronization symbols sent by all of the far-end sending units and the downstream synchronization symbols sent by all of the central office sending units are at a same location includes controlling, by the vectoring control entity, each central office sending unit to send a synchronization request to a corresponding far-end sending unit. The synchronization request includes a downstream synchronization symbol count so that after receiving the synchronization request the far-end sending unit enables an upstream synchronization symbol and a downstream synchronization symbol to be at a same location according to the downstream synchronization symbol count.

The vectoring control entity configures downstream synchronization symbol counters for all of the central office sending units in the vectoring group. When count values are the same, the downstream synchronization symbols sent by all of the central office sending units are enabled to be at a same location. The vectoring control entity then controls a central office sending unit to send a synchronization request to a far-end sending unit so that an upstream synchronization symbol and a downstream synchronization symbol are at a same location. Generally, the central office sending unit notifies the far-end sending unit of a count value of the downstream synchronization symbol of the central office sending unit. After receiving the synchronization request, the far-end sending unit enables the upstream synchronization symbol and the downstream synchronization symbol to be at a same location according to the count value of the downstream synchronization symbol. In this way, all of the upstream synchronization symbols and the downstream synchronization symbols are sent at the same location.

In another embodiment, if there is a non-vectoring group, that is, a Legacy Very-high-bit-rate digital subscriber line 2 (VDSL2) line, because a signal sent by using a synchronization symbol of the non-vectoring group is not controlled by the vectoring control entity, and pilot sequences modulated on synchronization symbols of the non-vectoring group are not orthogonal to each other and are not orthogonal to pilot sequences allocated by the vectoring group either, the vectoring control entity needs to configure all central office sending units or far-end sending units that are in the non-vectoring group so that locations of synchronization symbols sent by the central office sending units or the far-end sending units in the non-vectoring group and locations of the synchronization symbols sent by the central office sending units or far-end sending units in the vectoring group are staggered. Because random sequences are modulated at locations of non-synchronization symbols of the non-vectoring group, the random sequences may be considered to be approximately orthogonal within a relatively long time according to a statistical feature of the random sequences, which does not affect channel estimation between lines in the vectoring group. In addition, an NEXT channel or an FEXT channel from a line in the non-vectoring group to a line in the vectoring group may be estimated by using a correlation algorithm.

According to the foregoing embodiment, the locations of upstream synchronization symbols and downstream synchronization symbols of all uplinks and downlinks in an OSD system are the same. Sending unrelated pilot sequences at the locations of the synchronization symbols facilitates channel crosstalk estimation.

Figure 7:
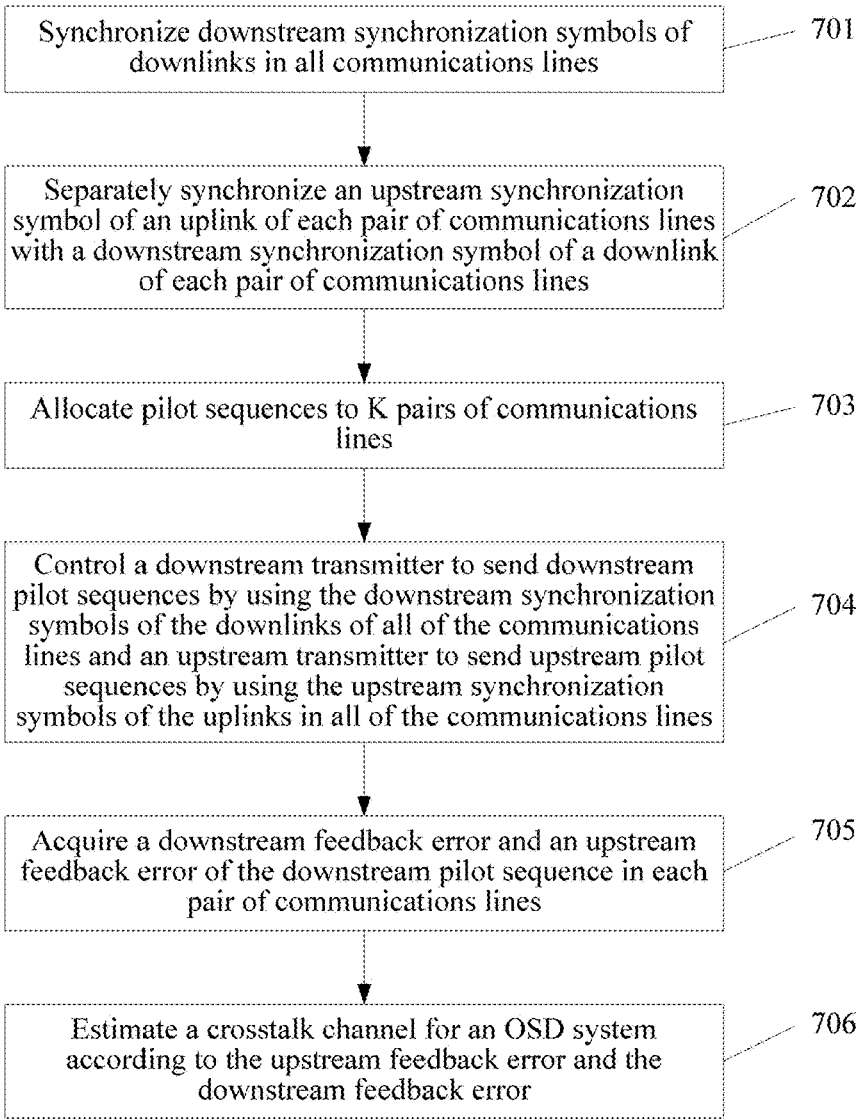
FIG. 7 is a flowchart of a crosstalk channel estimation method according to an embodiment of the present invention.

As an application of the line synchronization method shown in FIG. 6, FIG. 7 provides a crosstalk channel estimation method based on the architecture shown in FIG. 3. The method includes the following steps.

701: Synchronize downstream synchronization symbols of downlinks in all of the communications lines.

702: Separately synchronize an upstream synchronization symbol of an uplink of each pair of communications lines with a downstream synchronization symbol of a downlink of each pair of communications lines.

703: Allocate pilot sequences to the K pairs of communications lines, where pilot sequences allocated to each pair of communications lines are unrelated to pilot sequences allocated to the other K−1 pairs of communications lines, and an upstream pilot sequence allocated to the uplink in each pair of communications lines is unrelated to a downstream pilot sequence allocated to the downlink in each pair of communications lines.

704: Control a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines.

705: Acquire a downstream feedback error and an upstream feedback error of the downstream pilot sequence in each pair of communications lines.

706: Estimate a crosstalk channel for the OSD system according to the upstream feedback error and the downstream feedback error.

In step 701, to ensure that the sent unrelated pilot sequences are synchronized and aligned, synchronization symbols corresponding to probing signals carrying the pilot sequences need to be first aligned. There are two aligning methods disclosed herein.

In an embodiment, a VCE first aligns the downstream synchronization symbols of all of the communications lines, and then a central office end instructs the upstream synchronization symbol of each pair of communications lines to be separately aligned with the downstream synchronization symbol of each pair of communications lines. Because the downstream synchronization symbols of all of the communications lines are already aligned, and the upstream symbol of each pair of communications lines is also aligned with the downstream symbol of each pair of communications lines, the upstream synchronization symbols of all of the communications lines are simultaneously aligned with the downstream synchronization symbols, and naturally, the upstream synchronization symbols of all of the lines are also aligned.

In another embodiment, a VCE first separately aligns the downstream synchronization symbols of all of the communications lines and the upstream synchronization symbols of all of the communications lines. A symbol quantity offset between the downstream synchronization symbols and the upstream synchronization symbols is acquired, a central office end notifies user ends of the lines of the offset, and the user ends simultaneously make an adjustment according to the same offset, to align the upstream synchronization symbols and the downstream synchronization symbols of all of the lines.

Before step 703, 2K orthogonal pilot sequences further need to be generated, where K of the 2K pilot sequences are allocated to K downlinks, the remaining K pilot sequences are allocated to K uplinks, and the K pilot sequences allocated to the K uplinks and locations of synchronization symbols for synchronously sending the pilot sequences are sent to customer premises equipment by using a special operation channel (SOC).

An orthogonal pilot sequence allocation method is implemented in the following several manners:

In an implementation manner, it is assumed that there are K pairs of lines. As shown in FIG. 8, the VCE generates a 2*K Hadamard orthogonal matrix according to the quantity of the lines, selects K rows as pilot sequences in a downstream direction, and selects the remaining K rows as pilot sequences in an upstream direction. FIG. 9 is a schematic diagram of allocation of pilot sequences to two pairs of communications lines. A Hadamard orthogonal matrix whose dimension quantity is 4 is first generated, the first row and the third row are allocated to downstream directions of the two pairs of communications lines, and the other two rows are allocated to upstream directions.

In another implementation manner, the VCE generates a K+1 Hadamard orthogonal matrix according to a quantity of the lines, selects a pilot sequence of 1 s as pilot sequences in downstream directions of all of the lines, and selects the other K rows as pilot sequences in upstream directions. FIG. 10 is a schematic diagram of allocation of pilot sequences to two pairs of communications lines.

Subsequently, the VCE controls a TX transmitter to notify, by using a special operation channel SOC message, a user end of the pilot sequences that are sent in an upstream direction and the locations of the synchronization symbols for synchronously sending the pilot sequences. The user end starts to send probing signals at corresponding locations of the synchronization symbols, where the pilot sequences are carried in the probing signals, and the pilot sequences may be periodically sent.

After the user end receives the probing signals and the downstream pilot sequences in the probing signals, the user end starts to perform error feedback. There are two error feedback methods. One is to feed back a determined error by using a vectoring technology that calculates a value of an error by determining a constellation point. Because there is relatively strong NEXT interference, an error may occur in the constellation point determining. The other method is to instruct a receiving side to use a pilot sequence on a sending side as a reference signal, and feed back a reference signal error. After the receiving side obtains the error through calculation the error is fed back to the VCE by using an upstream embedded operation channel (EOC) or an L2 channel, for a downstream direction. For an upstream direction, the VCE directly receives the error.

In step 703, the method used by the VCE to allocate orthogonal pilot sequences may be further implemented in the following two manners.

One manner has the VCE divide the K pairs of communications lines into several groups Gs, and a quantity of wire pairs in each group is M. A 2*M Hadamard orthogonal matrix is first generated according to the quantity M of wire pairs. M rows are selected as time-domain pilot sequences in downstream directions of the groups, and the other M rows are selected as time-domain pilot sequences in upstream directions of the groups. Then in a frequency dimension, the first group sends a pilot sequence on only a tone of G*n+0, all of the other tones are 1 s, the first group sends a pilot sequence on only a tone of G*n+0 (n is a positive integer), all of the other tones are 1 s, the second group sends a pilot sequence on only a tone of G*n+1, and all of the other tones are 1 s. Analogically, the $G^{th}$ group sends a pilot sequence on only a tone of G*n+G−1, and all of the other tones are 1 s.

The other manner has the VCE divide the K pairs of communications lines into several groups Gs, and a quantity of wire pairs in each group is M. An M+1 Hadamard orthogonal matrix is first generated according to the quantity M of wire pairs, a row of 1 s is selected as pilot sequences in downstream directions of the groups, and the other M rows are selected as pilot sequences in upstream directions of the groups. Then in a frequency dimension, the first group sends a pilot sequence on only a tone of G*n+0, all of the other tones are 1 s, the first group sends a pilot sequence on only a tone of G*n+0 (n is a positive integer), all of the other tones are 1 s, the second group sends a pilot sequence on only a tone of G*n+1, and all of the other tones are 1 s. Analogically, the $G^{th}$ group sends a pilot sequence on only a tone of G*n+G−1, and all of the other tones are 1 s.

For lines in each group, the VCE separately obtains errors that are fed back for pilot sequences sent on corresponding subcarriers (tones), to estimate NEXT channels. The present invention is not limited to the several orthogonal pilot sequence allocation methods above.

The foregoing embodiments are specific to a system that supports the VCE to control a synchronization symbol of the system to send a specified pilot sequence. Because a legacy VDSL2 does not support controlling a synchronization symbol (sync symbol) of the VDSL2 to send a specified pilot sequence, the synchronization symbol of the VDSL2 line cannot be orthogonal to a pilot of a vectoring line.

In a possible implementation manner, step 704 of controlling a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines may be implemented in the following manner:

The vectoring control entity generates, according to a quantity of the lines, pilot sequences that are orthogonal to each other in upstream and downstream directions, the vectoring control entity respectively allocates the downstream pilot sequences and the upstream pilot sequences to the central office sending units and the far-end sending units, and then the central office sending units send the upstream pilot sequences to the far-end sending units by using SOC messages.

The vectoring control entity configures all central office sending units that are in a vectoring group so that all of the central office sending units modulate, on downstream synchronization symbols having an index, downstream pilot sequences having the same index. A central office sending unit modulates a downstream index value of a currently sent pilot sequence to enable the pilot sequence to be in symbol mode or sends a downstream index value of a currently sent pilot sequence by using an SOC message so that an index value of an upstream pilot sequence modulated on an upstream synchronization symbol is the same as an index value of a downstream pilot sequence modulated on a downstream synchronization symbol, thereby ensuring that at a same synchronization symbol location a pilot signal modulated on an uplink and a pilot signal modulated on a downlink are orthogonal to each other, which facilitates separation of upstream or downstream NEXT or FEXT interference signals when a channel is estimated.

The vectoring control entity configures all central office sending units in a vectoring group so that all of the central office sending units modulate, on downstream synchronization symbols having an index, downstream pilot sequences having the same index; and configures all far-end sending units that are in the vectoring group so that all of the far-end sending units modulate, on upstream synchronization symbols having an index, upstream pilot sequences having the same index.

A specific manner of configuring all central office sending units that are in a vectoring group, so that all of the central office sending units modulate, on downstream synchronization symbols having an index, downstream pilot sequences having the same index may be controlling, by the vectoring control entity, each central office sending unit to notify a corresponding far-end sending unit of a downstream index value of a currently sent pilot sequence and an allocated upstream pilot sequence so that an index value of the upstream pilot sequence modulated on an upstream synchronization symbol is the same as an index value of a downstream pilot sequence modulated on a downstream synchronization symbol.

In addition to the foregoing FEXT and NEXT interference estimation manners, the VCE may estimate FEXT and NEXT interference in the following manner:

$$E_{ds} = Feq(HX_{ds} + H_{NEXT}X_{us} + N) - X_{ref}$$

where parameters are separately as follows: $E_{ds}$ is an error sample fed back for a downstream direction; $X_{ds}$ represents a signal sent in a downlink direction; $X_{us}$ represents a signal sent in an uplink direction; $X_{ref}$ represents a reference signal for downlink error determining; N represents a noise signal on a downlink receive end; Feq represents a downlink frequency domain balancing coefficient; H represents a downstream FEXT channel matrix, and a diagonal element is a direct channel; and $H_{NEXT}$ represents an upstream NEXT channel matrix, and a diagonal element is an ECHO channel.

When upstream NEXT interference needs to be separated, a downstream pilot sequence is correlated to the downlink error signal, to obtain:

$$E_{ds}\overline{X}_{ds} = Feq \cdot H - I,$$

thereby obtaining a FEXT crosstalk matrix H through calculation.

When downstream FEXT interference needs to be separated, an upstream pilot sequence is correlated to the downlink error signal to obtain:

$$E_{ds}\overline{X}_{us} = Feq \cdot H_{NEXT},$$

thereby obtaining an NEXT crosstalk matrix $H_{NEXT}$ through calculation.

In legacy VDSL2, synchronization symbols of pairs of communications lines are all allocated a same sequence value. Therefore, sequences are correlated, and a crosstalk channel cannot be estimated. In this embodiment, a replacement solution is used. Sequences sent by using data symbols are random. Random signals may be considered to be approximately unrelated within a relatively long time. By using the feature, a data symbol and a synchronization symbol are enabled to be orthogonal so as to estimate a channel of crosstalk of the conventional line to a new line.

In this embodiment, data symbols of a Legacy VDSL2 may be first aligned with synchronization symbols of a vectoring line. Because random sequences are sent by using the data symbols, it may be considered that the data symbols achieve an effect of being unrelated to the synchronization symbols.

Other methods may be the same as or similar to the methods in the foregoing embodiments, and details are not described herein.

According to this embodiment of the present invention, NEXT and FEXT crosstalk channels can be distinguished when upstream and downstream spectrums are overlapped.

Figure 11:
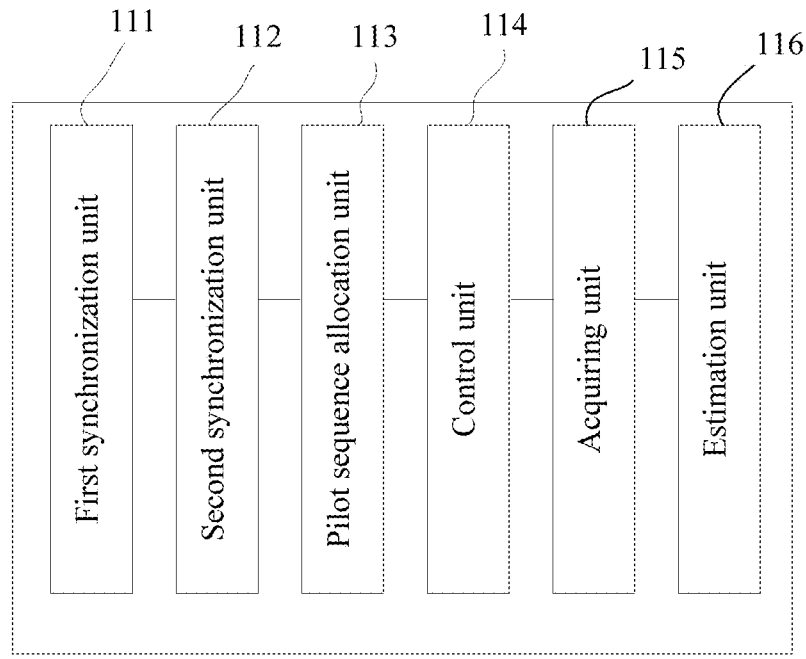
FIG. 11 is a structural diagram of a vectoring control entity according to an embodiment of the present invention.

Correspondingly, an embodiment of the present invention further provides a vectoring control entity. As shown in FIG. 11, the entity includes a first synchronization unit 111 configured to synchronize downstream synchronization symbols of downlinks in all of the communications lines, a second synchronization unit 112 configured to separately synchronize an upstream synchronization symbol of an uplink of each pair of communications lines with a downstream synchronization symbol of a downlink of each pair of communications lines, a pilot sequence allocation unit 113 configured to allocate pilot sequences to the K pairs of communications lines, where pilot sequences allocated to each pair of communications lines are unrelated to pilot sequences allocated to the other K–1 pairs of communications lines and an upstream pilot sequence allocated to the uplink in each pair of communications lines is unrelated to a downstream pilot sequence allocated to the downlink in each pair of communications lines, a control unit 114 configured to control a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines, an acquiring unit 115, configured to acquire a downstream feedback error and an upstream feedback error of the downstream pilot sequence in each pair of communications lines; and an estimation unit 116 configured to estimate a crosstalk channel for the OSD system according to the upstream feedback error and the downstream feedback error.

In an embodiment, the upstream symbols and the downstream symbols are synchronization symbols and the second synchronization unit is configured to instruct a customer premises equipment side to align the upstream synchronization symbol of the uplink with the downstream synchronization symbol of the downlink in each pair of communications lines.

In another implementation manner, the upstream symbols and the downstream symbols are synchronization symbols and the second synchronization unit is configured to instruct customer premises equipment to align the upstream synchronization symbols of the uplinks in all of the communications lines and send a symbol quantity offset between the upstream synchronization symbols and the downstream synchronization symbols in all of the communications lines to the customer premises equipment so that the customer premises equipment makes an adjustment according to the symbol quantity offset to synchronize the upstream synchronization symbols in all of the communications lines with the downstream synchronization symbols in all of the communications lines.

The pilot sequence allocation unit is configured to generate 2K orthogonal pilot sequences, allocate K of the 2K pilot sequences to K downlinks, allocate the remaining K pilot sequences to K uplinks, and send, to customer premises equipment by using a special operation channel, the K pilot sequences allocated to the K uplinks and locations of synchronization symbols for synchronously sending the pilot sequences.

In another implementation manner, the upstream symbols and the downstream symbols are data symbols and the second synchronization unit is configured to align the data symbols with synchronization symbols of a vectoring line.

Further, the acquiring unit is configured to acquire the downstream feedback error from errors that are fed back by a user end in an embedded operation channel and obtain the upstream feedback error according to a received probing signal sent by a user side.

Figure 12:
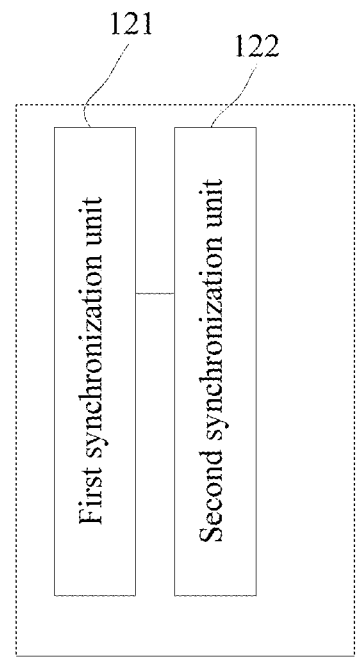
FIG. 12 is a structural diagram of a vectoring control entity according to an embodiment of the present invention.

As shown in FIG. 12, an embodiment of the present invention further provides another vectoring control entity applied to an overlapped spectrum duplex OSD system The OSD system includes K pairs of communications lines and each pair of communications lines includes an uplink and a downlink. In this embodiment, the vectoring control entity includes a first synchronization unit 121 configured to synchronize downstream synchronization symbols of downlinks in all of the communications lines, and a second synchronization unit 122 configured to separately synchronize an upstream synchronization symbol of an uplink of each pair of communications lines with a downstream synchronization symbol of a downlink of each pair of communications lines.

In an implementation manner, the first synchronization unit 121 is configured to configure all central office sending units that are in a vectoring group so that downstream synchronization symbols sent by all of the central office sending units are at a same location, where the vectoring group includes the multiple central office sending units and multiple far-end sending units. Each of the central office sending units controls one of the downlinks in the OSD system, and each of the far-end sending units controls one of the uplinks in the OSD system.

The second synchronization unit 122 is configured to configure all of the far-end sending units that are in the vectoring group, so that upstream synchronization symbols sent by all of the far-end sending units and the downstream synchronization symbols sent by all of the central office sending units are at a same location.

More, the second synchronization unit 122 is configured to: control each central office sending unit to send a synchronization request to a corresponding far-end sending unit, where the synchronization request includes a downstream synchronization symbol count, so that after receiving the synchronization request the far-end sending unit enables an upstream synchronization symbol and a downstream synchronization symbol to be at a same location according to the downstream synchronization symbol count.

In another embodiment, the vectoring control entity further includes a first configuring unit configured to configure all of the central office sending units or the far-end sending units in the vectoring group when there is a non-vectoring group in the OSD system so that synchronization symbols sent by all of the central office sending units or the far-end sending units in the vectoring group are at a same location, and a second configuring unit configured to configure all central office sending units or far-end sending units in the non-vectoring group so that locations of synchronization symbols sent by the central office sending units or the far-end sending units in the non-vectoring group and locations of the synchronization symbols sent by the central office sending units or far-end sending units in the vectoring group are staggered.

In another embodiment, the vectoring control entity further includes a pilot sequence allocation unit configured to allocate pilot sequences to the K pairs of communications lines, where pilot sequences allocated to each pair of communications lines are unrelated to pilot sequences allocated to the other K−1 pairs of communications lines, and an upstream pilot sequence allocated to the uplink in each pair of communications lines is unrelated to a downstream pilot sequence allocated to the downlink in each pair of communications lines, a control unit configured to control a downstream transmitter to send downstream pilot sequences by using the downstream synchronization symbols of the downlinks of all of the communications lines and an upstream transmitter to send upstream pilot sequences by using the upstream synchronization symbols of the uplinks in all of the communications lines, an acquiring unit configured to acquire a downstream feedback error and an upstream feedback error of the downstream pilot sequence in each pair of communications lines, and an estimation unit configured to estimate a crosstalk channel for the OSD system according to the upstream feedback error and the downstream feedback error.

In this embodiment, the upstream symbols and the downstream symbols are synchronization symbols; and the second synchronization unit 122 is configured to instruct a customer premises equipment side to align the upstream synchronization symbol of the uplink with the downstream synchronization symbol of the downlink in each pair of communications lines.

If the upstream symbols and the downstream symbols are synchronization symbols, the second synchronization unit 121 is configured to instruct customer premises equipment to align the upstream synchronization symbols of the uplinks in all of the communications lines and send a symbol quantity offset between the upstream synchronization symbols and the downstream synchronization symbols in all of the communications lines to the customer premises equipment so that the customer premises equipment makes an adjustment according to the symbol quantity offset to synchronize the upstream synchronization symbols in all of the communications lines with the downstream synchronization symbols in all of the communications lines.

In this embodiment, the pilot sequence allocation unit is configured to generate 2K orthogonal pilot sequences, allocate K of the 2K orthogonal pilot sequences to K downlinks, allocate the remaining K pilot sequences to K uplinks, and send, to customer premises equipment by using a special operation channel, the K pilot sequences allocated to the K uplinks and locations of synchronization symbols for synchronously sending the pilot sequences.

If the upstream synchronization symbols and the downstream synchronization symbols are data symbols, the synchronization units are configured to align the data symbols with synchronization symbols of a vectoring line.

Further, the acquiring unit is configured to acquire the downstream feedback error from errors that are fed back by a user end in an embedded operation channel and obtain the upstream feedback error according to a received probing signal sent by a user side.

In an embodiment, the control unit further includes a third configuring unit configured to configure all central office sending units that are in a vectoring group so that all of the central office sending units modulate, on downstream synchronization symbols having an index, downstream pilot sequences having the same index, and a fourth configuring unit configured to configure all far-end sending units that are in the vectoring group so that all of the far-end sending units modulate, on upstream synchronization symbols having an index, upstream pilot sequences having the same index.

The fourth configuring unit controls a central office sending unit to notify a corresponding far-end sending unit of a downstream index value of a currently sent pilot sequence and an allocated upstream pilot sequence so that an index value of the upstream pilot sequence modulated on an upstream synchronization symbol is the same as an index value of a downstream pilot sequence modulated on a downstream synchronization symbol.

An embodiment of the present invention further provides an overlapped spectrum duplex OSD system including a CO, CPE, and the vectoring control entity. The vectoring control entity and the central office device are connected. The central office device is connected to the customer premises equipment by using the K pairs of communications lines. A connection relationship between the three devices is shown in FIG. 3, and details are not described again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disk read-only memory (CD-ROM), or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A line synchronization method in an overlapped spectrum duplex (OSD) system having uplinks, downlinks, and K pairs of communications lines, wherein each pair of communications lines comprises an uplink and a downlink, and wherein the method comprises:
    synchronizing downstream synchronization symbols of downlinks in all of the pairs of communications lines at least in part by configuring all central office sending units in a vectoring group to cause downstream synchronization symbols from the central office sending units to be at a same location, wherein each of the central office sending units corresponds to a respective one of the downlinks in the OSD system; and
    separately synchronizing an upstream synchronization symbol of an uplink of each pair of communications lines with a downstream synchronization symbol of a downlink of each pair of communications lines at least in part by configuring all far-end sending units in the vectoring group to cause upstream synchronization symbols from all of the far-end sending units and the downstream synchronization symbols from all of the central office sending units to be at the same location, wherein each of the far-end sending units corresponds to a respective one of the uplinks in the OSD system.

2. The method according to claim 1, wherein configuring all of the far-end sending units in the vectoring group comprises controlling each central office sending unit to send a synchronization request to a corresponding far-end sending unit, wherein the synchronization request comprises a downstream synchronization symbol count.

3. The method according to claim 1, further comprising configuring all central office sending units or far-end sending units in a non-vectoring group in the OSD system to cause synchronization symbols from the central office sending units or the far-end sending units in the non-vectoring group and the synchronization symbols from the central office sending units or far-end sending units in the vectoring group to be staggered.

4. The method according to claim 1, wherein after separately synchronizing the upstream synchronization symbol of the uplink of each pair of communications lines with the downstream synchronization symbol of the downlink of each pair of communications lines, the method further comprises:
    allocating pilot sequences to the K pairs of communications lines, wherein pilot sequences allocated to each pair of communications lines are unrelated to pilot sequences allocated to the other K−1 pairs of communications lines, and wherein an upstream pilot sequence allocated to the uplink in each pair of communications lines is unrelated to a downstream pilot sequence allocated to the downlink in each pair of communications lines;
    controlling a downstream transmitter to send downstream pilot sequences using the downstream synchronization symbols of the downlinks of all of the communications lines;
    controlling an upstream transmitter to send upstream pilot sequences using the upstream synchronization symbols of the uplinks in all of the communications lines;
    acquiring a downstream feedback error and an upstream feedback error of the downstream pilot sequence in each pair of communications lines; and
    estimating a crosstalk channel for the OSD system according to the upstream feedback error and the downstream feedback error.

5. The method according to claim 4, wherein before allocating the pilot sequences to the K pairs of communications lines, the method further comprises:
    generating 2K orthogonal pilot sequences;
    allocating K of the 2K pilot sequences to K downlinks;
    allocating the remaining K pilot sequences to K uplinks; and
    sending, to customer premises equipment using an operation channel, the K pilot sequences allocated to the K uplinks and locations of synchronization symbols for synchronously sending the pilot sequences.

6. The method according to claim 1, wherein the upstream synchronization symbols and the downstream synchronization symbols are synchronization symbols, and wherein separately synchronizing the upstream synchronization symbol of the uplink of each pair of communications lines with the downstream synchronization symbol of the downlink of each pair of communications lines comprises instructing a customer premises equipment side to align the upstream synchronization symbol of the uplink with the downstream synchronization symbol of the downlink in each pair of communications lines.

7. The method according to claim 1, wherein the upstream synchronization symbols and the downstream synchronization symbols are synchronization symbols, and wherein separately synchronizing the upstream synchronization symbol of the uplink of each pair of communications lines with the downstream synchronization symbol of the downlink of each pair of communications lines comprises:
   instructing customer premises equipment to align the upstream synchronization symbols of the uplinks in all of the communications lines; and
   sending a symbol quantity offset between the upstream synchronization symbols and the downstream synchronization symbols in all of the communications lines to the customer premises equipment.

8. The method according to claim 1, wherein the upstream synchronization symbols and the downstream synchronization symbols are data symbols, and wherein separately synchronizing the upstream synchronization symbol of the uplink of each pair of communications lines with the downstream synchronization symbol of the downlink of each pair of communications lines comprises aligning the data symbols with synchronization symbols of a vectoring line.

9. A vectoring control entity applied to an overlapped spectrum duplex (OSD) system having uplinks, downlinks, and K pairs of communications lines, wherein each pair of communications lines comprises an uplink and a downlink, and wherein the vectoring control entity comprises:
   a memory; and
   a processor coupled to the memory and configured to:
      synchronize downstream synchronization symbols of downlinks in all of the pairs of communications lines at least in part by configuring all central office sending units in a vectoring group to cause downstream synchronization symbols from the central office sending units to be at a same location, wherein each of the central office sending units corresponds to a respective one of the downlinks in the OSD system; and
      separately synchronize an upstream synchronization symbol of an uplink of each pair of communications lines with a downstream synchronization symbol of a downlink of each pair of communications lines at least in part by configuring all far-end sending units in the vectoring group to cause upstream synchronization symbols from all of the far-end sending units and the downstream synchronization symbols from all of the central office sending units to be at the same location, wherein each of the far-end sending units corresponds to a respective one of the uplinks in the OSD system.

10. The vectoring control entity according to claim 9, wherein the processor is configured to control each central office sending unit to send a synchronization request to a corresponding far-end sending unit, and wherein the synchronization request comprises a downstream synchronization symbol count.

11. The vectoring control entity according to claim 9, wherein the processor is further configured to configure all central office sending units or far-end sending units in a non-vectoring group of the OSD system to cause synchronization symbols from the central office sending units or the far-end sending units in the non-vectoring group and locations of the synchronization symbols from the central office sending units or far-end sending units in the vectoring group to be staggered.

12. The vectoring control entity according to claim 9, wherein the processor is further configured to:
   allocate pilot sequences to the K pairs of communications lines, wherein pilot sequences allocated to each pair of communications lines are unrelated to pilot sequences allocated to the other K−1 pairs of communications lines, and wherein an upstream pilot sequence allocated to the uplink in each pair of communications lines is unrelated to a downstream pilot sequence allocated to the downlink in each pair of communications lines;
   control a downstream transmitter to send downstream pilot sequences using the downstream synchronization symbols of the downlinks of all of the communications lines;
   control an upstream transmitter to send upstream pilot sequences using the upstream synchronization symbols of the uplinks in all of the communications lines;
   acquire a downstream feedback error and an upstream feedback error of the downstream pilot sequence in each pair of communications lines; and
   estimate a crosstalk channel for the OSD system according to the upstream feedback error and the downstream feedback error.

13. The vectoring control entity according to claim 12, wherein the processor is further configured to:
   configure all of the central office sending units in the vectoring group to modulate, on downstream synchronization symbols having an index, downstream pilot sequences having the same index; and
   configure all of the far-end sending units to modulate, on upstream synchronization symbols having an index, upstream pilot sequences having the same index.

14. The vectoring control entity according to claim 9, wherein the processor is further configured to instruct a customer premises equipment side to align the upstream synchronization symbol of the uplink with the downstream synchronization symbol of the downlink in each pair of communications lines.

15. The vectoring control entity according to claim 9, wherein the processor is further configured to:
   instruct customer premises equipment to align the upstream synchronization symbols of the uplinks in all of the communications lines; and
   send a symbol quantity offset between the upstream synchronization symbols and the downstream synchronization symbols in all of the communications lines to the customer premises equipment.

16. The vectoring control entity according to claim 9, wherein the upstream synchronization symbols and the downstream synchronization symbols are data symbols, and wherein the processor is further configured to align the data symbols with synchronization symbols of a vectoring line.

17. A line synchronization method in an overlapped spectrum duplex (OSD) system having uplinks, downlinks, and K pairs of communications lines, wherein each pair of communications lines comprises an uplink and a downlink, and wherein the method comprises:
   synchronizing downstream synchronization symbols of downlinks in all of the pairs of communications lines;
   separately synchronizing an upstream synchronization symbol of an uplink of each pair of communications lines with a downstream synchronization symbol of a downlink of each pair of communications lines;
   allocating pilot sequences to the K pairs of communications lines, wherein pilot sequences allocated to each pair of communications lines are unrelated to pilot sequences allocated to the other K−1 pairs of communications lines, and wherein an upstream pilot sequence allocated to the uplink in each pair of communications lines is unrelated to a downstream pilot sequence allocated to the downlink in each pair of communications lines;

controlling a downstream transmitter to send downstream pilot sequences using the downstream synchronization symbols of the downlinks of all of the communications lines;

controlling an upstream transmitter to send upstream pilot sequences using the upstream synchronization symbols of the uplinks in all of the communications lines;

acquiring a downstream feedback error and an upstream feedback error of the downstream pilot sequence in each pair of communications lines; and estimating a crosstalk channel for the OSD system according to the upstream feedback error and the downstream feedback error.

18. The line synchronization method according to claim 17, wherein controlling the downstream transmitter to send the downstream pilot sequences includes configuring all central office sending units in a vectoring group of the OSD system to modulate, on downstream synchronization symbols having an index, downstream pilot sequences having the same index, wherein each of the central office sending units corresponds to a respective one of the downlinks in the OSD system, wherein controlling the upstream transmitter to send upstream pilot sequences using the upstream synchronization symbols of the uplinks in all of the communications lines includes configuring all of far-end sending units to modulate, on upstream synchronization symbols having the index, upstream pilot sequences having the same index, and wherein each of the far-end sending units corresponds to a respective one of the uplinks in the OSD system.

* * * * *